(12) United States Patent
Morgan et al.

(10) Patent No.: US 9,296,447 B1
(45) Date of Patent: Mar. 29, 2016

(54) APPARATUS AND METHOD FOR WAVE SHAPING

(71) Applicants: Dean Morgan, Horseshoe Bay, TX (US); Jeanna Jette, Spicewood, TX (US)

(72) Inventors: Dean Morgan, Horseshoe Bay, TX (US); Jeanna Jette, Spicewood, TX (US)

( * ) Notice: Subject to any disclaimer, the term of this patent is extended or adjusted under 35 U.S.C. 154(b) by 0 days.

(21) Appl. No.: 14/444,935

(22) Filed: Jul. 28, 2014

Related U.S. Application Data

(60) Provisional application No. 61/859,188, filed on Jul. 27, 2013.

(51) Int. Cl.
*B63B 1/24* (2006.01)
*B63B 1/28* (2006.01)

(52) U.S. Cl.
CPC .. *B63B 1/242* (2013.01); *B63B 1/28* (2013.01)

(58) Field of Classification Search
CPC ............ B63B 1/20; B63B 1/28; B63B 1/286; B63B 1/32; B63B 35/85

USPC .......................... 114/271, 274, 280, 284, 285
See application file for complete search history.

(56) References Cited

U.S. PATENT DOCUMENTS

| | | | | |
|---|---|---|---|---|
| 4,846,429 A | * | 7/1989 | Scheurer | F16B 47/00 248/205.8 |
| 5,715,876 A | * | 2/1998 | Burt | B63B 25/082 114/343 |
| 6,012,408 A | * | 1/2000 | Castillo | 114/280 |
| 2013/0213293 A1 | * | 8/2013 | Gasper et al. | 114/284 |

* cited by examiner

*Primary Examiner* — Lars A Olson
(74) *Attorney, Agent, or Firm* — Rick B. Yeager

(57) ABSTRACT

A device is temporarily attached to one side of the stern of a boat in order to modify the wake pattern of the boat by effectively making one side of the boat longer than the other side. The delayed wave on the opposite side of the boat from the wake shaping device allows the wave to crest over the natural wave on the side where the device is installed. In one example, the device has a frame with a side surface angled outwardly 12 degrees from the side of the boat, a mounting surface shaped to match the mounting area of the boat stern, and one or more vacuum cups. A wedge shape utilizes water pressure to distribute the load evenly across the fastening side of the device, thereby allowing for a tight fit to the back of the boat.

13 Claims, 15 Drawing Sheets

APPARATUS AND METHOD FOR WAVE SHAPING

This is a US non-provisional patent application is related to U.S. Provisional Patent Application No. 61/859,188 filed Jul. 27, 2013 by applicants, and claims the benefit of that filing date.

BACKGROUND

1. Field of Invention

The current invention relates to an apparatus and method for modifying the wake of a ski boat. More particularly, a device is temporarily attached to one side of the stern of a boat in order to modify the wake pattern of the boat.

2. Prior Art

When the boat hull length is an exact mirror image from side to side, then the boat's wave rolls from each side of the boat and meets in the center.

In the current invention, a wake shaping device is attached on one side of the stern, thereby effectively making one side of the boat longer than the other side. This modification delays the formation of the wave on the opposite side so that it is behind the natural wave formation on the side where the wake shaping device is installed. This lifts the water and causes the wake to be taller and longer on the opposite side from the installation of the wake shaping device. The delayed wave on the opposite side of the boat from the wake shaping device allows the wave to crest over the natural wave on the side where the device is installed.

The sport of wake surfing is currently the fastest growing segment of behind-the-boat water sports. Wake surfing involves a short surfboard and a short rope that is only used to get up from the water, then is thrown into the boat as the rider gets comfortable on the wave. When the rope is thrown in the boat, the wake surfer rides the boat wake as he or she would an ocean wave. To get a wake large enough to ride, people add ballast bags to the back of the boat, oftentimes on the side where the wake surfer is riding, tilting the boat to one side. It is also common practice to put all of the people in the boat on the side the wake surfer is riding to further weight that side. This tilting of the boat can cause the boat to take on water when going over larger waves and can also cause difficulty for the driver, as weight in the stern of the boat makes the bow of the boat ride higher causing obstructed sightlines.

The wake shaping device of the current invention makes ballast and other weighting of the boat less necessary, as the extension of the boat increases wake height and performance without adding weight to the boat. If ballast is used, then the boat can be weighted evenly, and spectators in the boat can distribute their weight more evenly. This affords the driver clearer sightlines for safer driving. It also allows the boat to ride higher in the water, as it was designed, so the boat doesn't take on water when going over larger waves. For more advanced riders, ballast may be required.

Wake surfing is performed close to the stern of the boat, as that is where the boat wake crests and forms the best surfing wake. This can be dangerous for beginner surfers, if they are not accustomed to shifting their weight from front to back on the surfboard to control their momentum and placement on the wake. Surfing so close to the stern of the boat can also be dangerous, as the wake surfer is close to where the exhaust exits the back of the boat. Exhaust fumes can have obvious negative affects on the wake surfer, including carbon monoxide poisoning.

The wake shaping device of the current invention elongates the "sweet spot" of the wake, the area where the rope goes slack and the wake surfer can ride without the rope, allowing them to ride further back from the stern of the boat in a safer zone. It also makes the wake taller and firmer, minimizing the froth of the wave. Froth does not have any forward push to give the surfer the momentum needed to stay with the boat.

Ballast tanks are filled and drained according to which side the wake surfer surfs on, so there is some down time between surfers if they ride on different sides. The wake shaping device allows for a quicker shift from side to side, as ballast tanks do not need to be emptied and refilled between surfers.

In one embodiment of the current invention, there are separate, specifically molded wake shaping devices for port- and starboard-side surfers.

Some makes and models of boats have built in wake surfing devices. Malibu offers Surf Gate™, which is a complicated mechanical system tied to electronics and electric actuators. Electric motors drive a hinged flat board from the back of the platform toward the outside of the boat. It is electronically controlled from the driver's console. It cannot be retrofitted on other models of boats and costs thousands of dollars as an upgrade package. Nautique's version is also not retrofittable and costs thousands of dollars for the upgrade package. Nautique has a plate that is mounted flat to the stern of the boat. Electric motors drive the plate out and down, beyond the edge of the boat, changing the wake shape. To get boats with these options, the base boat is nearing $100,000.

The wake shaping device of the current invention is much less expensive than the upgrade packages of other manufacturers.

It will be molded specifically to the design of the different boat manufacturers' sterns, ensuring optimal fit. The devices are retrofittable and can be molded to fit nearly any existing inboard boat's stern.

In one embodiment, the wake shaping device uses a vacuum cup attachment means. Some manufacturers sterns will require more than one vacuum cup.

In one example, the wedge shape of the wake shaping device utilizes water pressure to distribute the load evenly across the fastening side of the device, thereby allowing for a tight fit to the back of the boat.

There are not any electronic systems to install or repair. The compact size and light-weight design of the wake shaping device will not clutter or weight down the boat. When the device is not in use, it is stored inside the boat.

SUMMARY OF INVENTION

In one embodiment of the current invention, a wake shaping device is fastened to one side of the back of an inboard boat. In one example, the wake shaping device comprises a molded scoop-shaped extension, one or more vacuum cups, and safety connection.

The side and bottom of the wake shaping device work together to displace the water and shape the wake.

Varying degrees of a twist or flare can be molded into the wake shaping device to additionally enhance the wake.

The vacuum cup may be recessed into the wake shaping device so that the mounting surface attaches to the stern is as close as possible to the boat.

A lanyard may be used as a safety in the rare event that suction is lost in the vacuum cup.

A vacuum cup pressure relief valve may be extended to above waterline and may be attached to the boat eyelet along with the lanyard. Having the vacuum cup pressure relief valve above waterline allows for easier securing and release from the boat, because air is transferred through the vacuum cup much easier than water. The vacuum cup may have a pump device that is pumped to secure it to the back of the boat.

The wake shaping device can be shaped and notched to fit around swim platforms or other features installed by boat manufacturers.

DESCRIPTION OF EMBODIMENT

Starboard Wave Shaping Device

Figure 1:
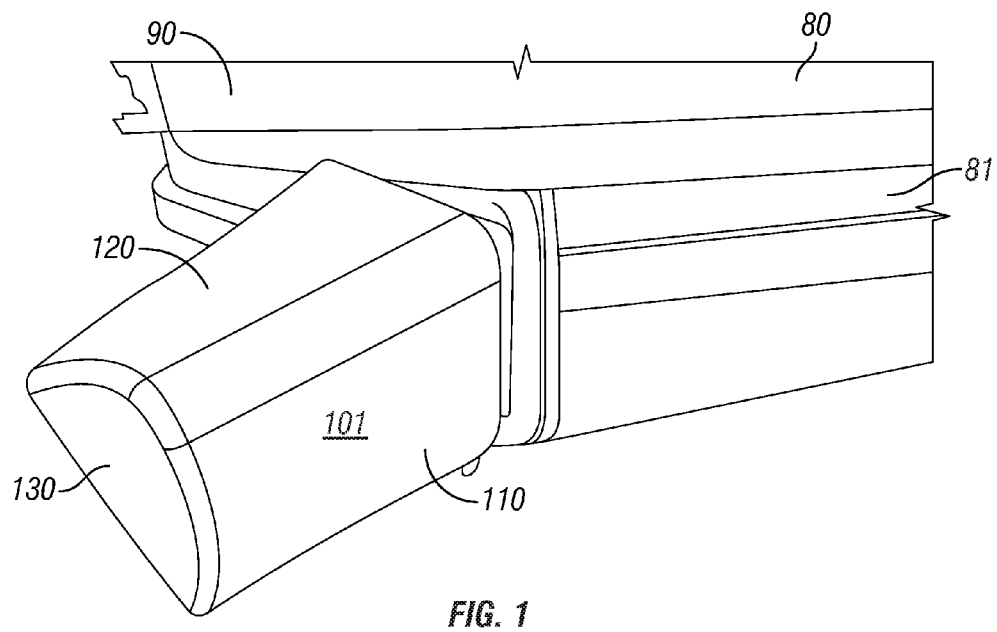
FIG. 1 is a side perspective view of an embodiment of a wave shaping device of the current invention attached to the starboard side of the stern of a boat.
Figure 2:
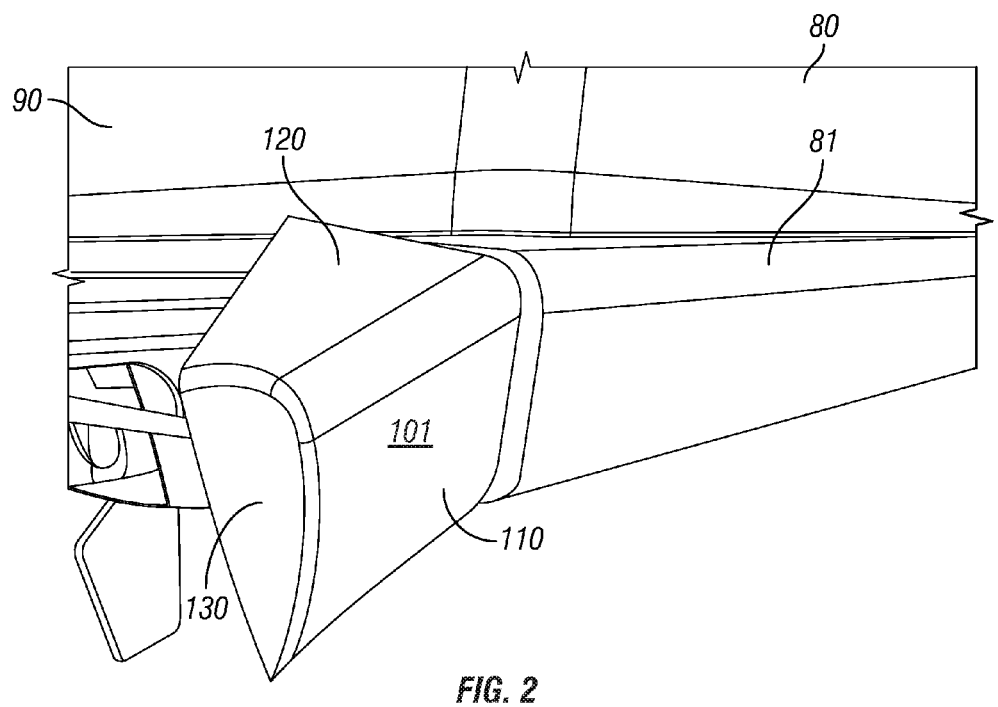
FIG. 2 is a rear perspective view of the wave shaping device of FIG. 1.
Figure 3:
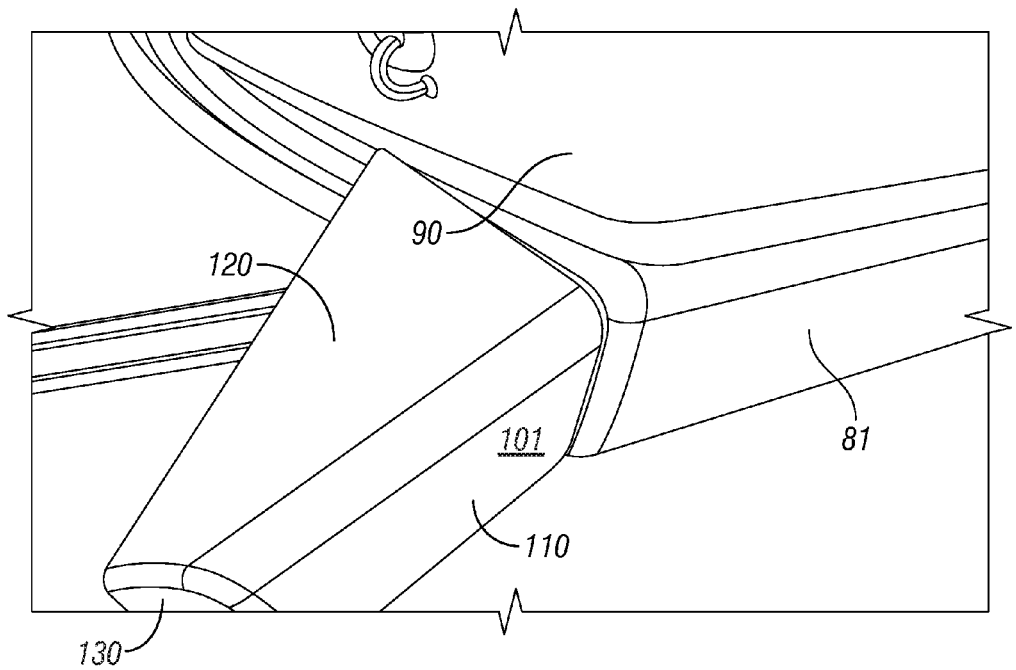
FIG. 3 is a top perspective view of the wave shaping device of FIG. 1.

FIG. 1 is a side perspective view of a wave shaping device 101 attached to the starboard side 81 of the stern 90 of a boat 80. FIG. 2 is a rear perspective view of the wave shaping device of FIG. 1. FIG. 3 is a top perspective view of the wave shaping device of FIG. 1.

In this embodiment, the wave shaping device 101 comprises a frame with a side surface 110 which is angled outwardly approximately 12 degrees from the starboard side 81 of the boat 80. The device also comprises a front mounting surface 150 (not shown) which is preferably shaped to match the mounting area of the stern 90; a top surface 120; rear surface 130; and a bottom surface 140 (not shown).

Figure 4:
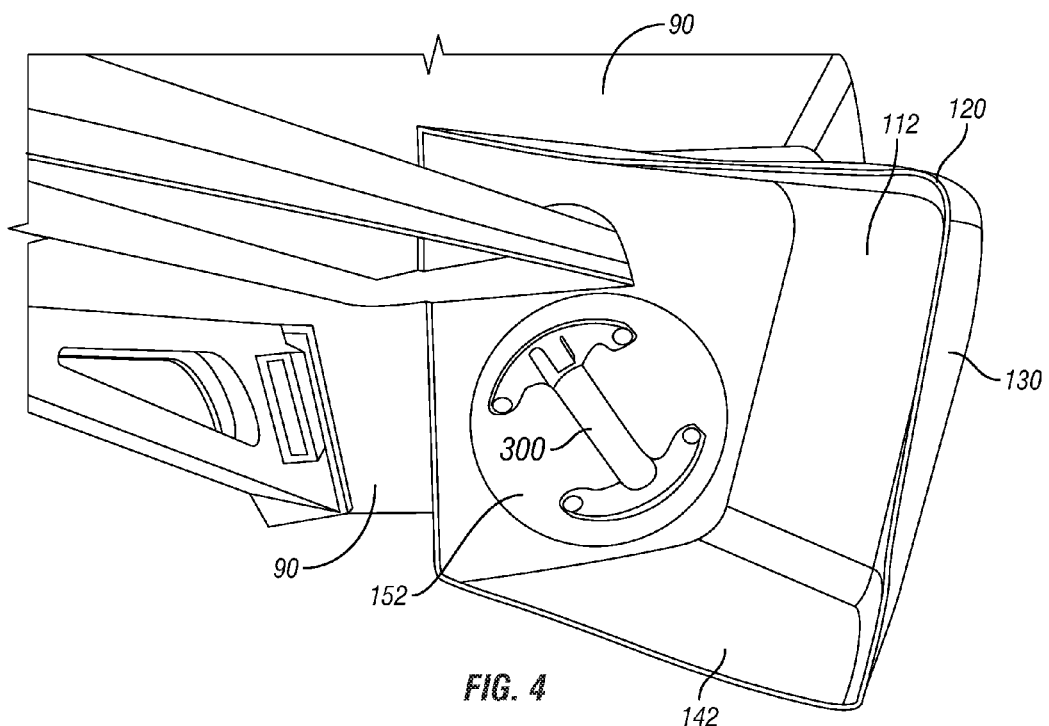
FIG. 4 is a side perspective view of the inside surfaces of the wave shaping device of FIG. 1.

FIG. 4 is a side perspective view of the inside surfaces of the wave shaping device 101 of FIG. 1. In this example, the device has a hollow, scoop shape. FIG. 4 shows the inside surface 142 of the bottom portion of the device; the inside surface 112 of the side portion 110; the inside surface 152 of the front mounting portion 150, and the vacuum cup and pump assembly 300. In this example, the bottom portion 140 is approximately flush with the bottom edge of the boat in the area of the mounted device. The 12 degree outward angle of the side portion can be observed in FIG. 4.

DESCRIPTION OF EMBODIMENT

Port Wave Shaping Device

Figure 5:
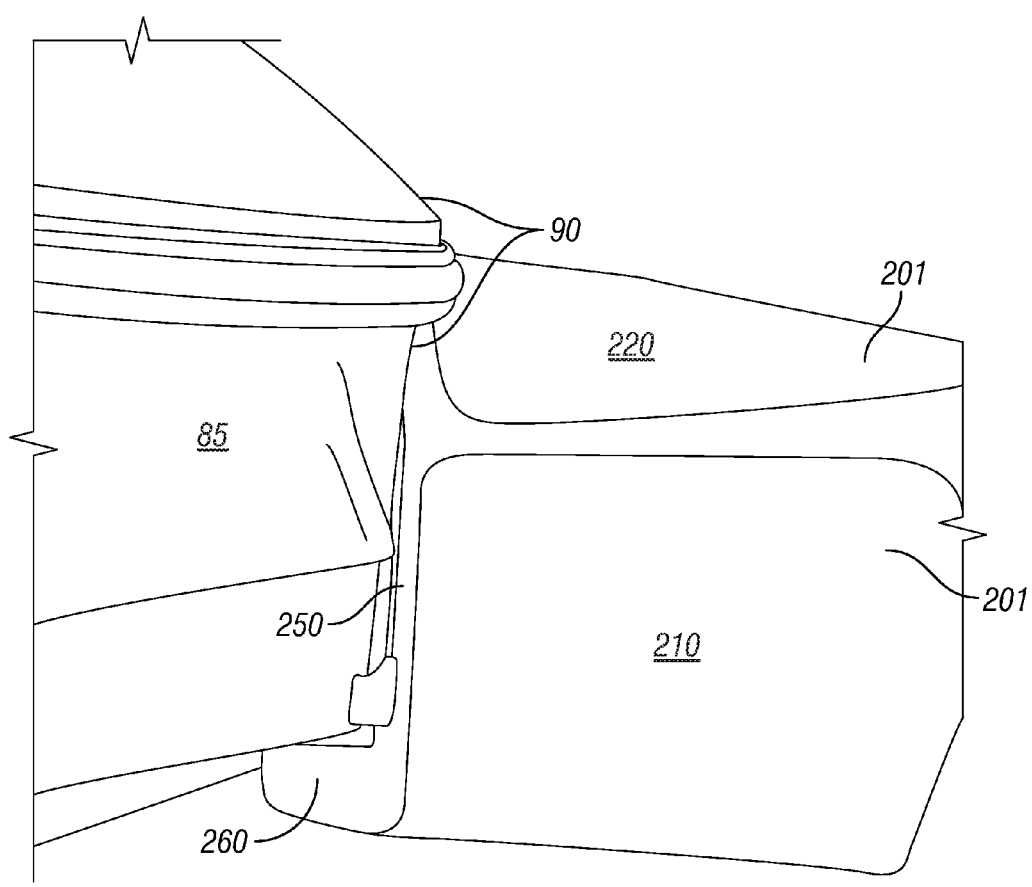
FIG. 5 is a side view of another embodiment of a wave shaping device of the current invention attached to the port side of the stern of a boat.

FIG. 5 is a side view of another embodiment of a wave shaping device 201 of the current invention attached to the port side 85 of the stern 90 of a boat. In this example, the shape of the device is similar to that of example device 101, with the addition of an offset lip to match the lower profile of the boat at the device mounting area. This example device comprises a side portion 210, a top portion 220, and a front mounting surface 250.

Figure 6:
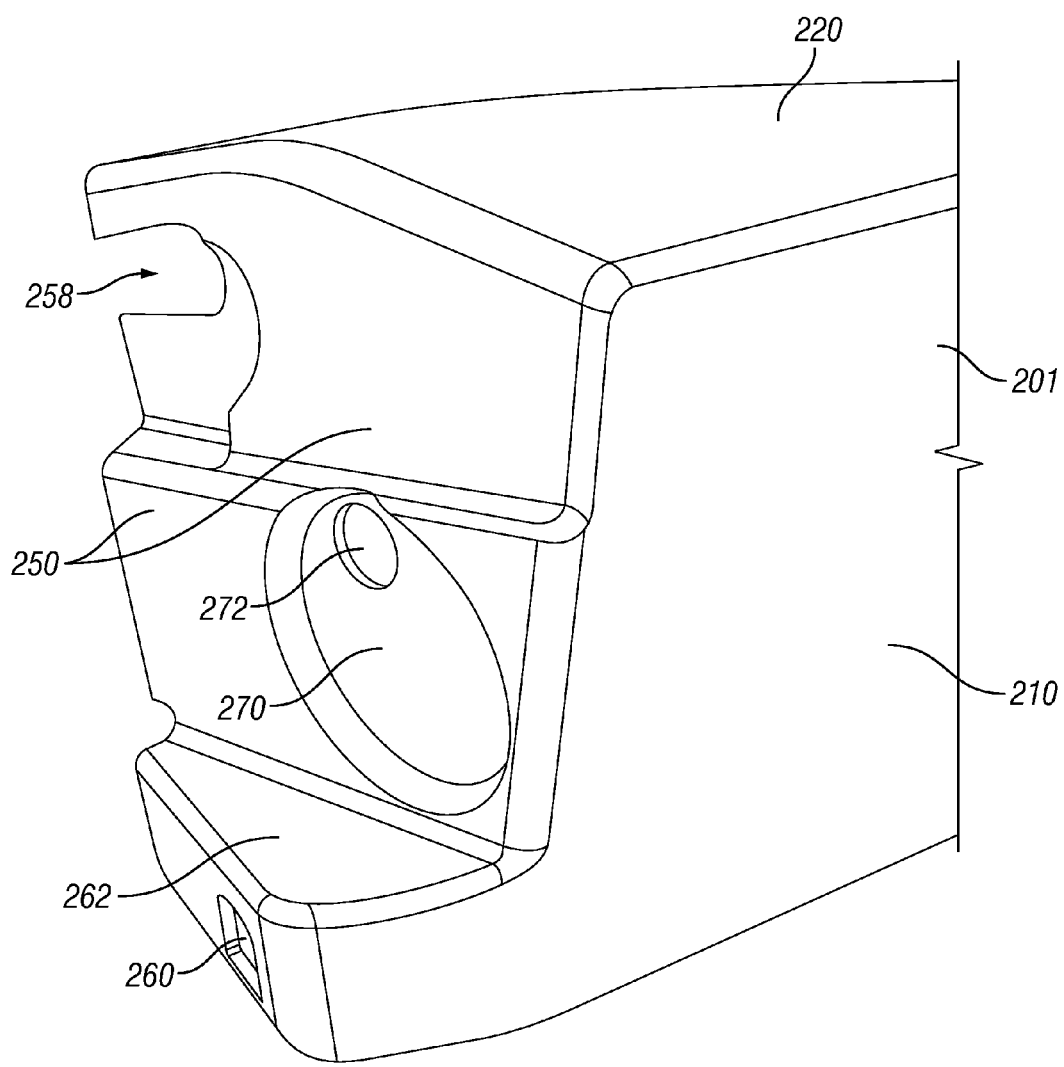
FIG. 6 is a front perspective view of the wave shaping device of FIG. 5 resting on a bench.

FIG. 6 is a front perspective view of the wave shaping device 201 showing the side portion 210, the top portion 220, and front mounting surface 250. The offset lip 260 includes a top extension 262 to accommodate the hull design. The mounting surface 250 has a recess 270 for mounting a single 8 inch diameter vacuum cup. Vacuum cup mounting and access features are provided in the recess area. In other examples, such as when the stern profile does not permit a single large vacuum cup, two or more vacuum cups are provided on the mounting surface.

Figure 7:
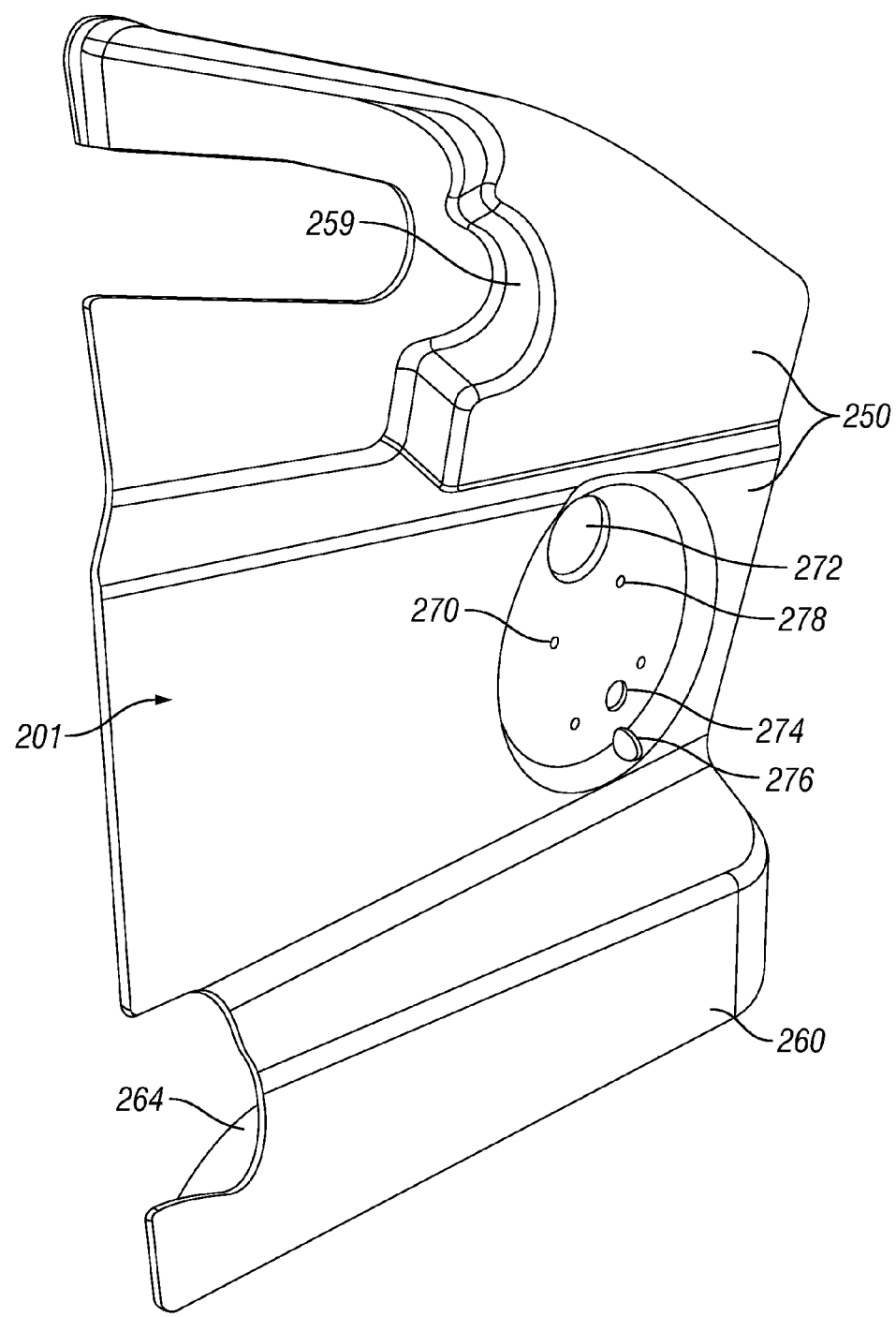
FIG. 7 is a front perspective view of the wave shaping device of FIG. 5 from a point that would be near the centerline of the boat if the device were mounted.

FIG. 7 is a front perspective view of the wave shaping device 201 showing details of the mounting surface 150 which has been shaped to mate with a particular Nautique™ ski boat. The mating surface includes a cutout 258 and recess for the ski platform and recess 259 for the grab handle. The offset lip includes a cutout 264 to accommodate the end of a detail line on the stern of the boat. The vacuum cup mounting recess 270 includes features 272, a finger hole for releasing the suction of certain models of vacuum cups, mounting screw holes 278, 274 where the vacuum pump attaches to the suction cup, and 276 an addition finger hole for releasing the suction of certain models of vacuum cups. Not all manufacturers of vacuum cups have a release valve.

Figure 8:
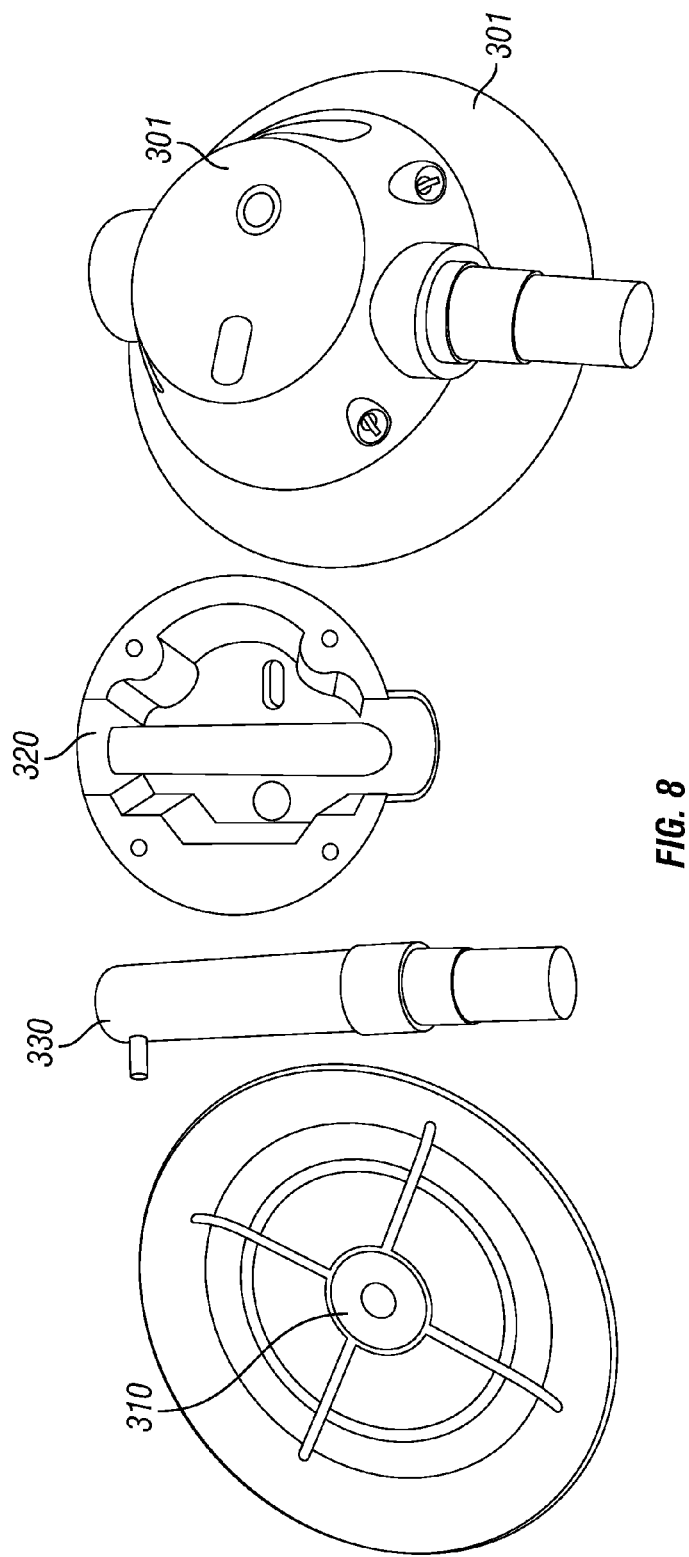
FIG. 8 is a top perspective view of an example vacuum cup assembly and components.

FIG. 8 is a top perspective view of a suction cup 310, a vacuum cup 330, and a mounting bracket 320 which form an example vacuum cup assembly 301. In one example, a single vacuum cup assembly is provided with a pair of wave shaping devices—a starboard device and a port device. The model shown is a 6" SeaSucker™ brand vacuum cup. The vacuum cup assembly is quickly mounted to the desired device for installation. The vacuum pump is applied to the stern of the boat and pumped with the users thumb until the white line does not extend past the edge of the vacuum cup.

Figure 9A:
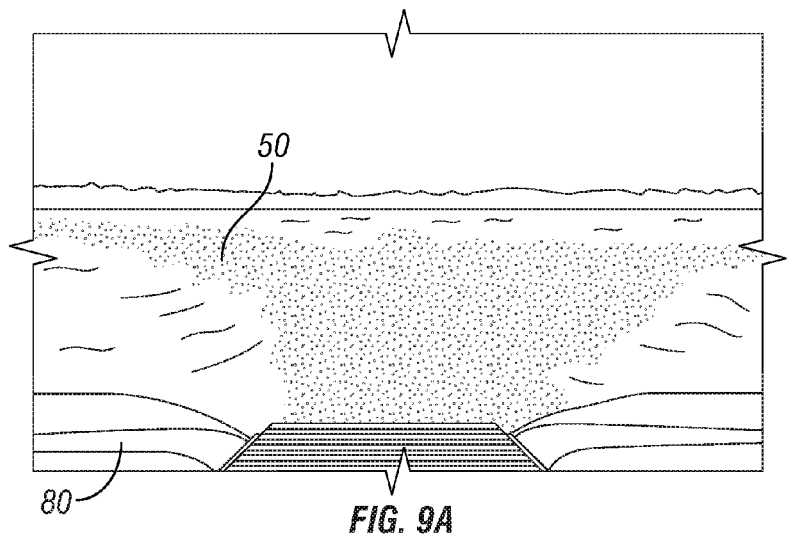
FIGS. 9A and 10A show a wave generated by a ski boat without ballast and without a wave shaping device.
Figure 10A:
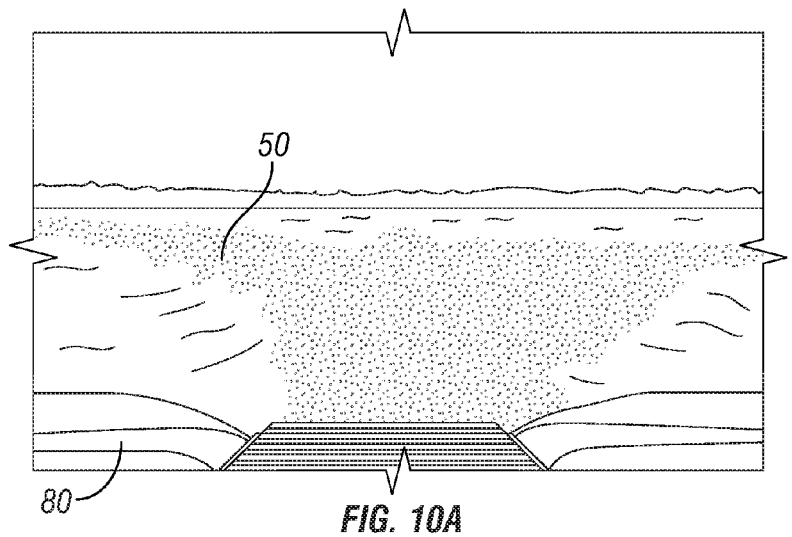

FIGS. 9A and 10A show a wave 50 generated by a ski boat 80 without ballast and without a wave shaping device. In this example, the wave is relatively low, frothy, and symmetric. The frothy section of the wave is full of air and has no push to give the surfer momentum needed to stay with the boat.

Figure 9B:
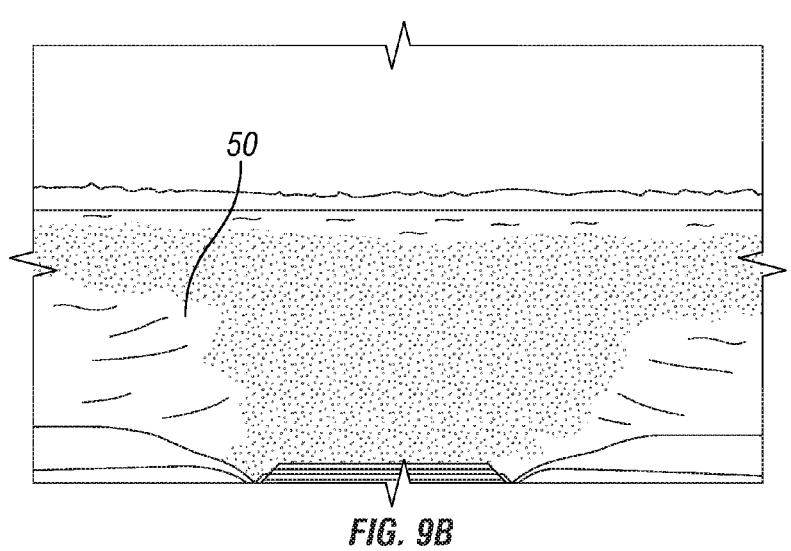
FIGS. 9B and 10B show a wave generated by a ski boat with ballast and without a wave shaping device.
Figure 10B:
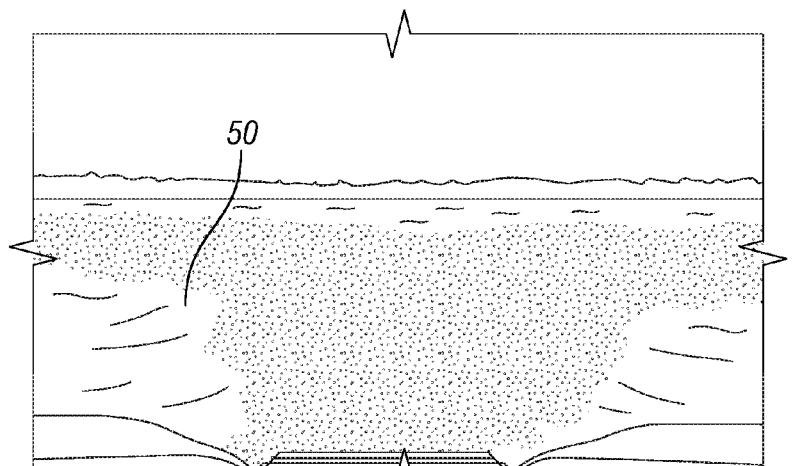

FIGS. 9B and 10B show a wave 51 generated by a ski boat with ballast and without a wave shaping device. In this example, the wave is higher but is frothy, and symmetric.

Figure 9C:
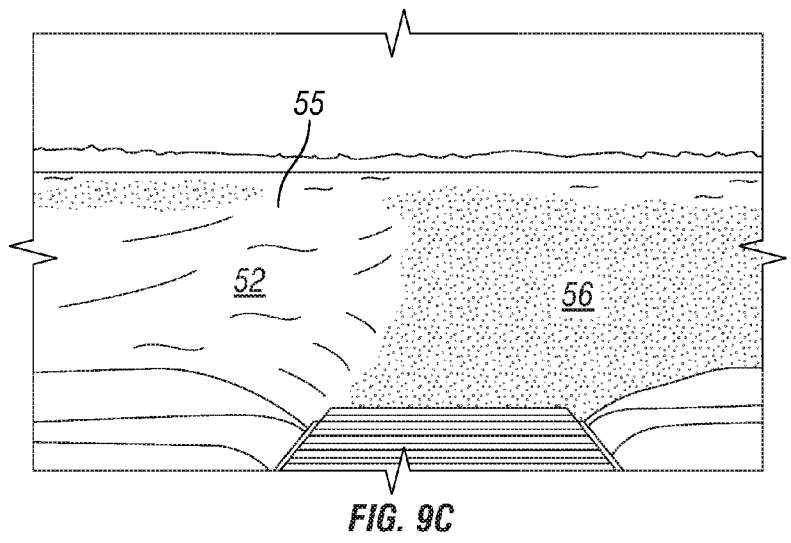
FIGS. 9C and 10C show a wave generated by a ski boat with ballast and with a wave shaping device mounted on the port side of the boat.
Figure 10C:
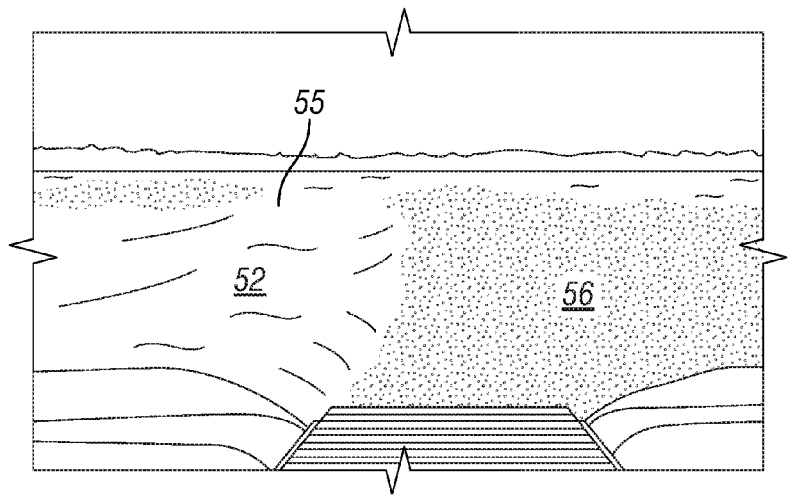

FIGS. 9C and 10C show a wave 51 generated by a ski boat with ballast and with a wave shaping device mounted on the port side of the boat as in FIGS. 1-4. In this example, the wave is taller and asymmetric, with the surf "sweet spot" 55 portion of the wave substantially firmer and less frothy 56, and the surf "sweet spot" portion of the wave substantially further from the boat.

Figure 13:
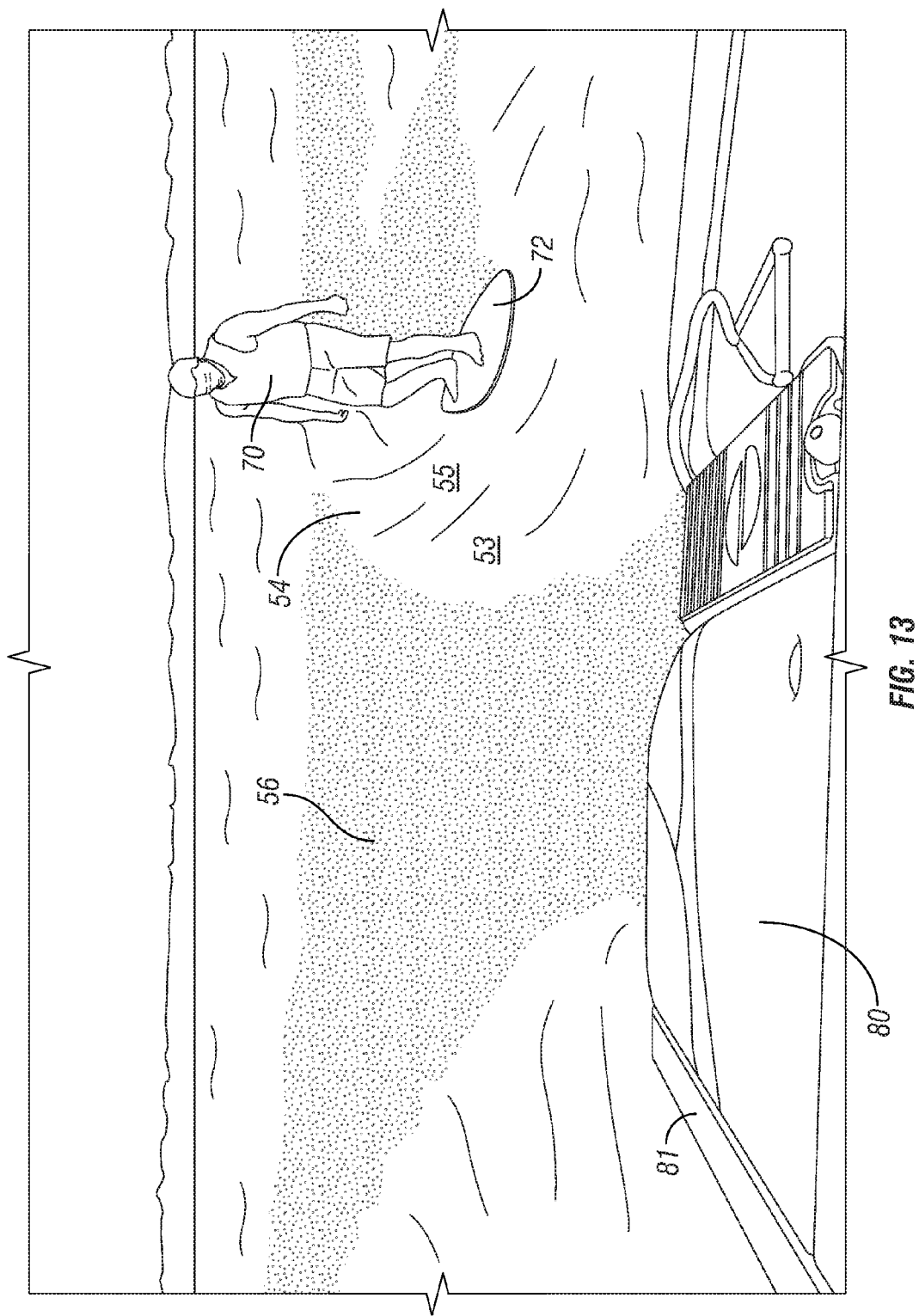
FIG. 13 is front view of a wake surfer riding a modified wave formed by a wave shaping device mounted on the starboard side of a boat.

FIG. 13 is front view of a wake surfer 70 riding a modified wave 53 formed by a wave shaping device mounted on the starboard side 81 of a boat 80. The clean wave 53 with a curl 54 at the top as seen in this figure is the optimal for propelling the surfboard 72 forward to stay with the boat. When the wake shaper is applied to the port side of the boat, the starboard side is the side where the surfer rides. The wake shaper is applied to the opposite side of where the rider rides.

DESCRIPTION OF EMBODIMENT

Wave Shaping Device with Side Surface and a Mounting Surface Only

Figure 14:
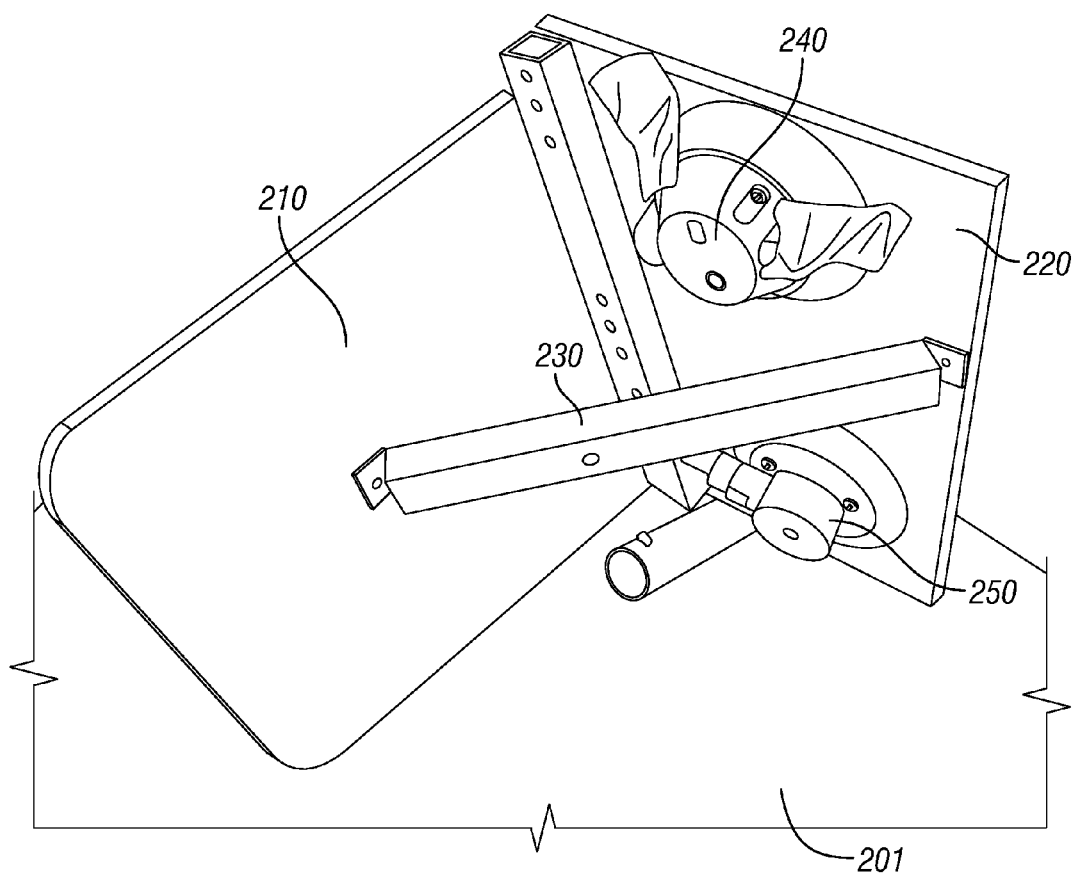
FIG. 14 is a top rear perspective view of another embodiment of the current invention with only a side surface and a mounting surface.
Figure 15:
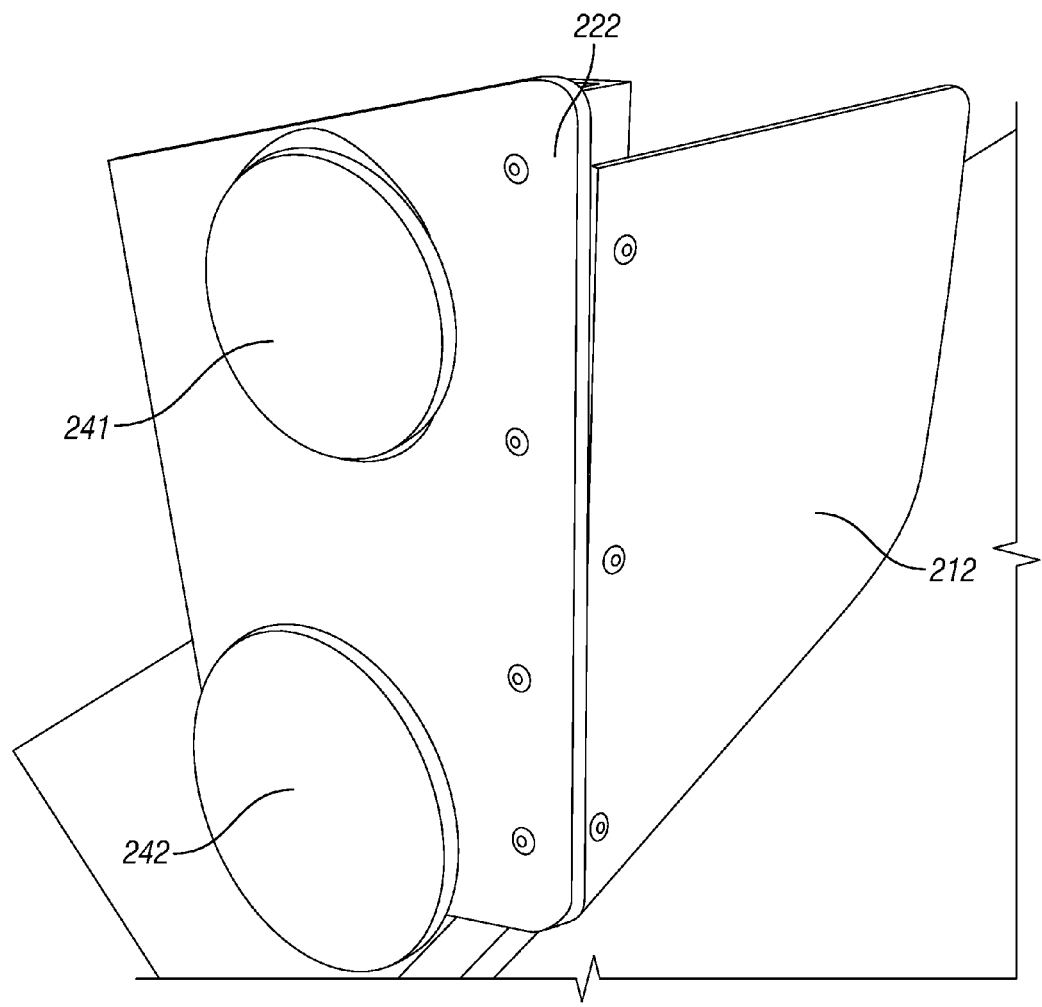
FIG. 15 is a front perspective view of the wave shaping device of FIG. 14.

FIG. 14-15 are views of another embodiment 201 of the current wave shaping device. FIG. 15 is a front perspective view of the wave shaping device of FIG. 14. In this embodiment, the wave shaping device 201 has only two surfaces—a side surface 212 and a mounting surface 222. In this prototype, a cross brace 230 was provided to stabilize the inside of the side surface 210 relative to the inside of the mounting surface 220. Two suction cup assemblies 240 and 250 were provided. Suction cups 241 and 242 were used mount the wave shaping device to the port side of the stern of the boat.

Figure 16:
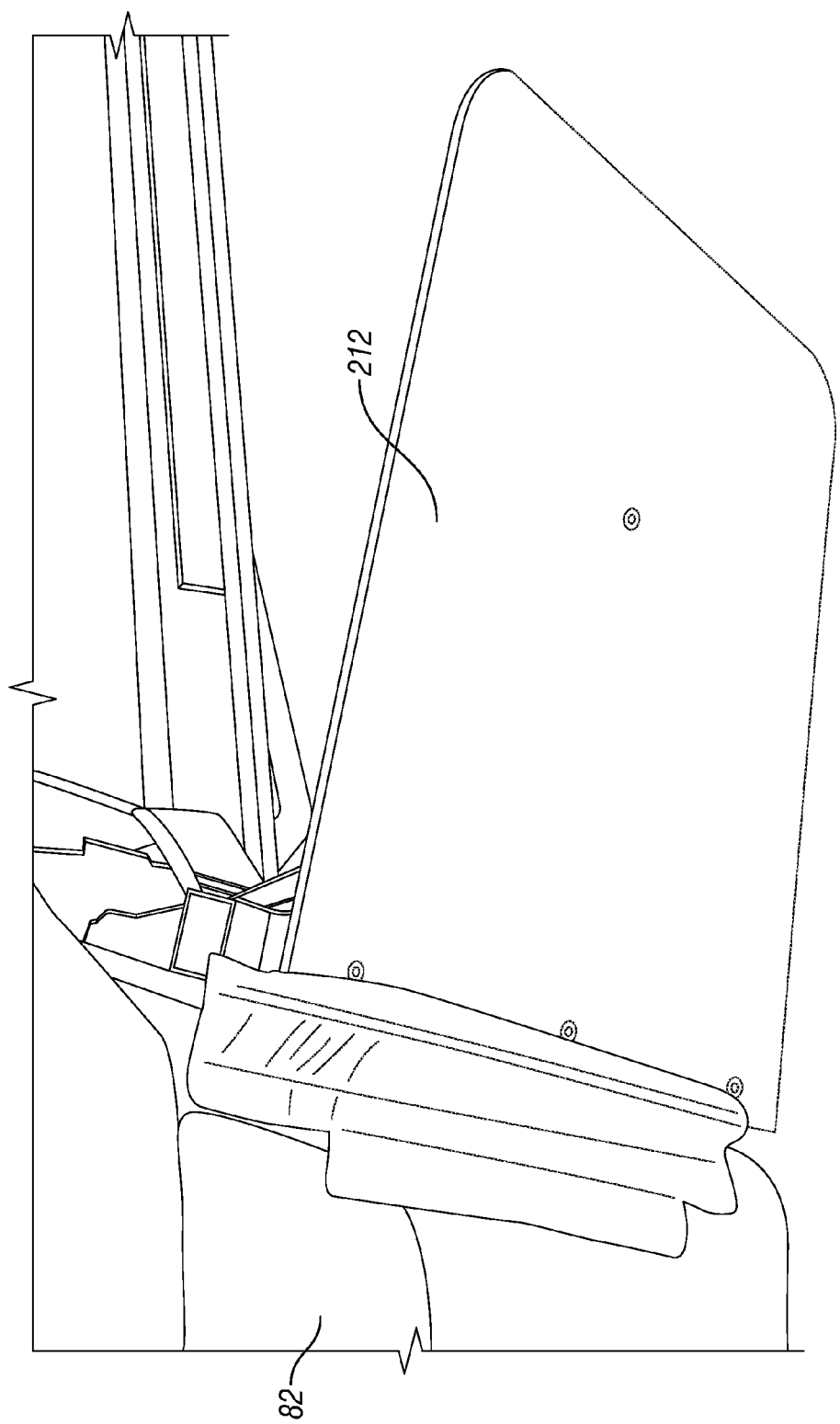
FIG. 16 is a side perspective view of the wave shaping device of FIG. 14 installed on a boat.
Figure 17:
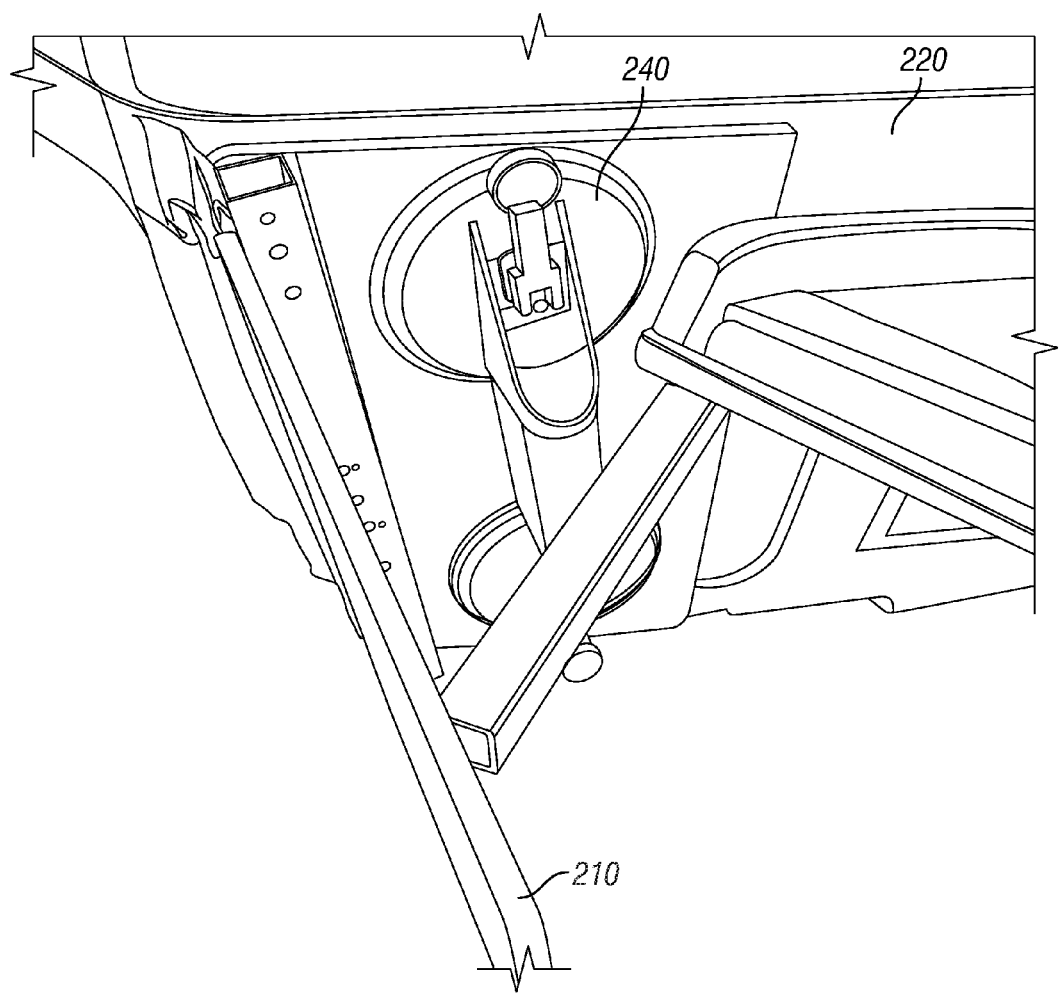
FIG. 17 is a top perspective view of the wave shaping device of FIG. 14 installed on a boat.

FIG. 16-17 are views of the wave shaping device 201 installed on the port side 82 of a boat. In this prototype, duct tape was used to seal between the side surface and the stern. The duct tape was later removed, and the device worked effectively without the seal. Production versions can be tailored to the shape of the stern of particular boat models.

DESCRIPTION OF EMBODIMENT

Wave Shaping Device with Side Surface Extending Below Hull

Figure 18:
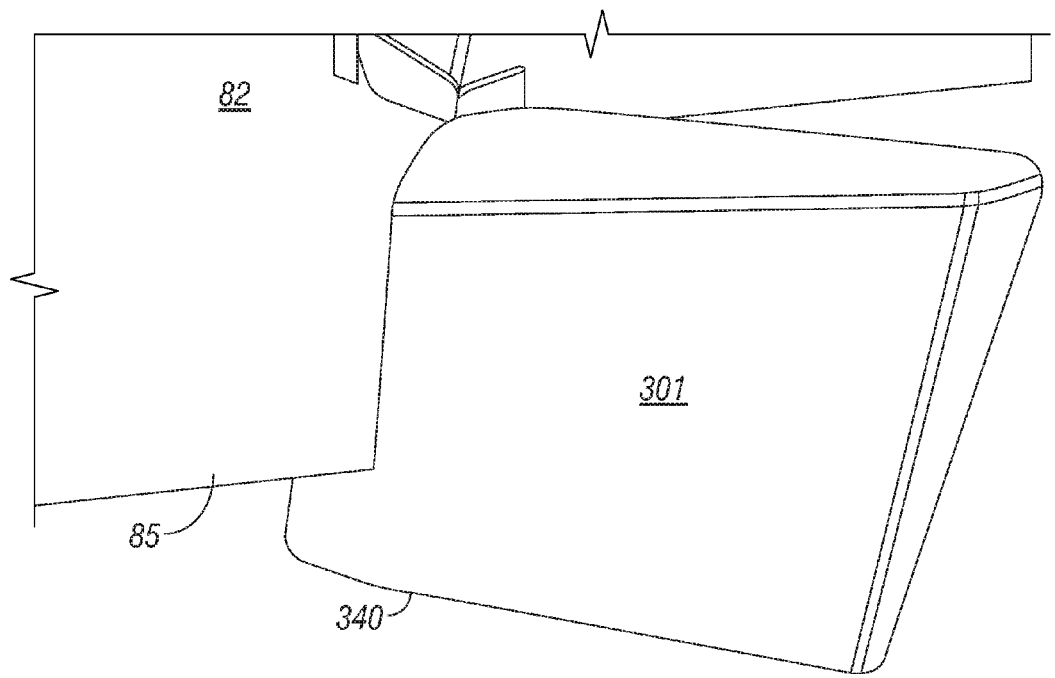
FIG. 18 is a side view of another embodiment of a wave shaping device installed on the port side of a boat.
Figure 19:
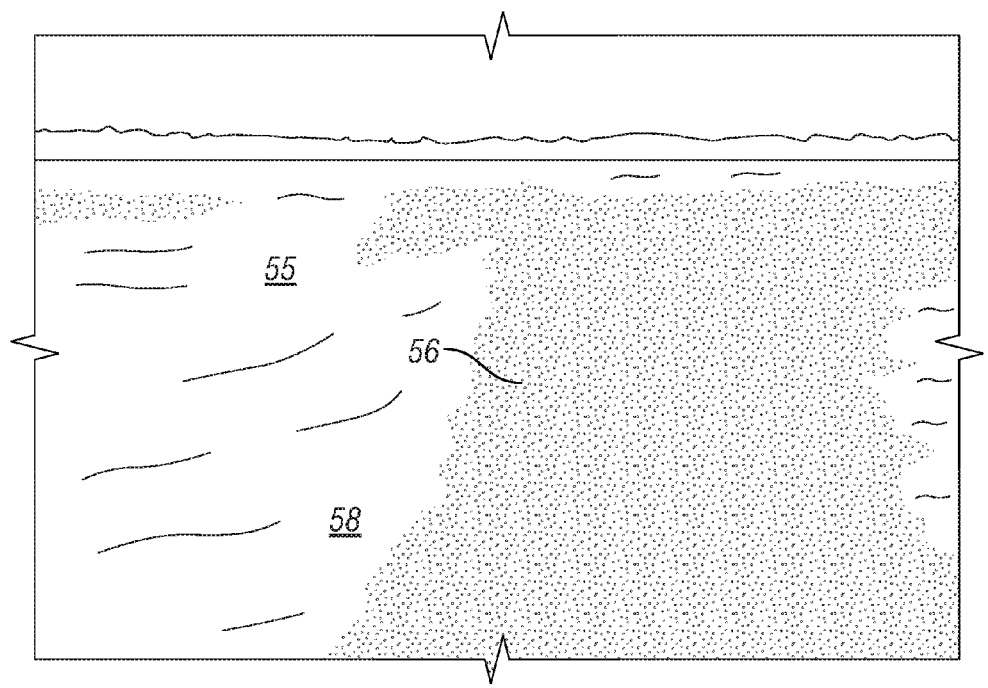
FIG. 19 is an example modified wave produced by the wave shaping device of FIG. 18.

FIG. 18 is a side view of another example device 301 installed on the port side 82 of a boat. In this example, the bottom surface 340 is positioned about three inches below the hull 85, and the device produces a steeper wake 58 as shown in FIG. 19.

Variations

Applicant has found that a relatively small frame with a side extension on one side of the boat provides unexpectedly large benefits in wave height, wave firmness, and forming the wave board wave portion further from the boat. Applicant's invention is not limited to the specific examples described, but includes variations described below and other variations that may be apparent to those skilled in the art.

Materials

The example devices were constructed of vacuum-formed coextrusion of acrylic and ABS. Other materials including polyethylene, polypropylene, other thermoplastics fiberglass, urethane foams, and metal may be used.

Vacuum Cup(s)

The test boat for the example devices described above had relatively large flat mounting areas on the stern, so a single 8 inch vacuum cup could be used. The 8-inch vacuum cup secured the wave shaping device when the boat was driven at a speed in excess of 25 mph—which is much greater than typical speeds of 7 to 12 mph for wake surfing.

The vacuum cup was a model which is used for moving glass and granite slabs. Other vacuum cups that we have used are made by SeaSucker™ and include a 4.5" model and a 6" model.

In other cases, two or more vacuum cups can be provided to provide an adequate mounting area on a more complex stern shape.

Some vacuum cups require the user to break the suction by squeezing a tab and relieving the vacuum pressure underneath the cup.

Other Mounting Methods

In these examples, the wave shaping device was temporarily attached to the boat with vacuum cups. Other mounting methods may be used including various mounting brackets and clamps.

Side Angle

In various experiments, side outward angles of up to 20 degrees were evaluated. A side angle of about 12 degrees provided the best results for the particular ski boat used. Other boats may have different optimum angles.

Side Flare

The examples described above have relatively flat side portions. Applicant had expected improved wave shape if the side portions were flared outwardly. However, limited testing has not established that benefit for the test boat used.

Figure 11:
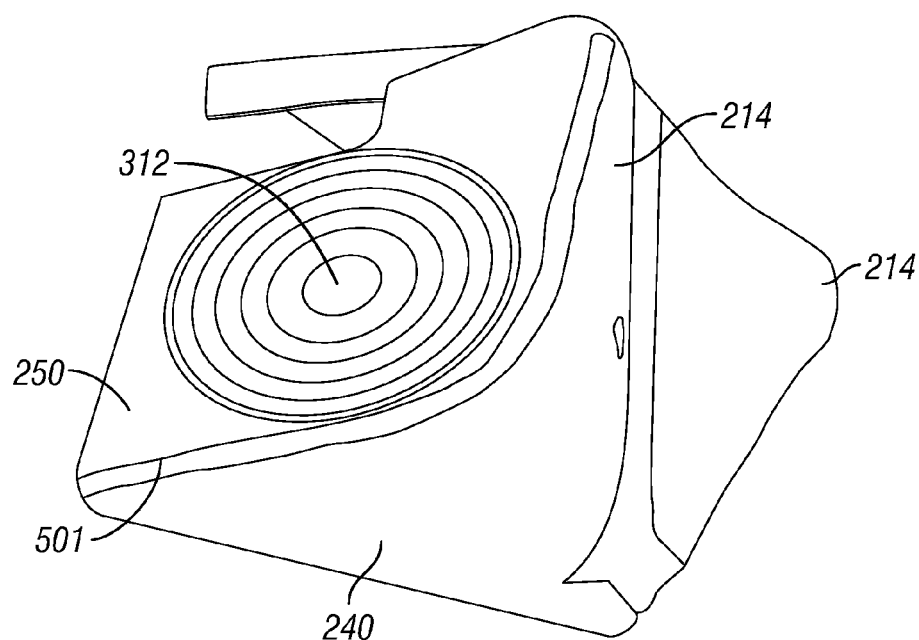
FIG. 11 is a front perspective wave shaping device with a modified side portion shape.

FIG. 11 is a front perspective wave shaping device 202 with a modified side portion shape 214 relative to the shape of device 101. In this example, the side portion flares outwardly.

Figure 12:
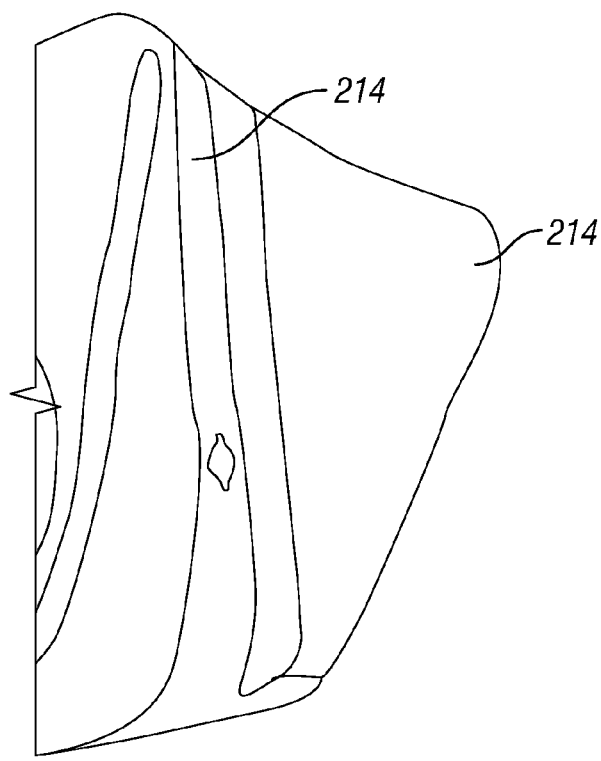
FIG. 12 is a detailed front perspective view of the modified wave shaping device of FIG. 11.

FIG. 12 is a detailed front perspective view of the modified wave shaping device 202 showing the flared side portion 214. The results of this modification did not create the desired effect. When the wake shaper protrudes below the hull level, the wake was altered and, in some cases, improved.

Gasket

The device was tested with and without a gasket. With the recessed vacuum cup, the gasket did not make a significant improvement on the test boat. Applicant theorizes that the force of the water on the outwardly projecting side surface acts to compress the vacuum cup against the stern and to resist shear forces that would detach the device.

Mounting Shape

The example devices were designed for a particular boat model, including cutouts for a swimming platform and a lip extension. Other boat models might have different mounting surface profiles.

The scope of the invention is not limited to the particular examples and embodiments described above.

What is claimed is:

1. A wake shaping device for attachment to the stern of a boat having a centerline and a waterline, in order to modify the wake pattern of the boat, the wake shaping device comprising
    a frame comprising
        a mounting face,
        a vertically-oriented outside surface projecting outwardly with respect to the centerline of the boat; and
    a vacuum cup stern attachment means.

2. The wake shaping device of claim 1 wherein the frame further comprises a bottom.

3. The wake shaping device of claim 2 further comprising a vacuum cup mounting recess in the mounting face.

4. The wake shaping device of claim 2 further comprising a vacuum cup pump.

5. The wake shaping device of claim 2 further comprising a vacuum cup pressure relief valve.

6. The wake shaping device of claim 5 wherein
the vacuum cup pressure relief valve extends above the waterline, such that the vacuum cup is released by air entering the vacuum cup pressure relief valve.

7. The wake shaping device of claim 1 further comprising a lanyard for retaining the device.

8. The wake shaping device of claim 1 further comprising a floatation element, such that the device floats if detached from the boat.

9. A wake shaping method for a boat having a stern, a centerline, and a waterline, the wake shaping method comprising
providing a wake shaping device comprising
a frame comprising
a mounting face,
a vertically-oriented outside surface projecting outwardly with respect to the centerline of the boat, and
a stern attachment means;
temporarily attaching the wake shaping device to the port or starboard side of the stern with one or more vacuum cup; and
operating the boat so that as the boat moves forward,
a first wave pattern is generated from the side of the boat without the wave modification device, and
a second wave pattern, asymmetric to the first wave pattern, is generated from the side of the boat with the wave modification device, and
the intersection of the first wave pattern and the second wave pattern is further from the stern than when the wake modification device is not installed, such that the height of the wave is increased, and the wave is formed further from the rear of the boat.

10. The wake shaping method of claim 9 further comprising
providing a wave shaping device with a frame comprising a bottom.

11. The wake shaping method of claim 9 further comprising
providing a vacuum cup pressure relief valve with an air inlet above the water line; and
engaging the vacuum cup pressure relief valve to release the suction cup; and
removing the wake shaping device.

12. The wake shaping method of claim 9 further comprising
providing a flotation element on the wake shaping device.

13. The wake shaping method of claim 9 further comprising
providing a first wake shaping device frame configured for the starboard side of a boat;
providing a second wake shaping device frame configured for the port side of a boat; and
providing an interchangeable vacuum cup assembly that can be used to attach either the first wake shaping device frame or the second wake shaping device frame to the stern of the boat.

* * * * *